United States Patent [19]  
Elmer

[11] 4,338,263  
[45] Jul. 6, 1982

[54] TIRE CORD ADHESIVES

[75] Inventor: Otto C. Elmer, Akron, Ohio

[73] Assignee: The General Tire & Rubber Company, Akron, Ohio

[21] Appl. No.: 179,187

[22] Filed: Aug. 18, 1980

Related U.S. Application Data

[63] Continuation-in-part of Ser. No. 36,112, May 4, 1979, abandoned.

[51] Int. Cl.³ .......................... C08K 3/36; C08L 7/00; C08L 61/06
[52] U.S. Cl. .................................. 260/762; 524/100; 524/508; 525/132
[58] Field of Search .................... 260/762, 38, 42.47, 260/42.46; 525/132; 524/100, 508

[56] References Cited

U.S. PATENT DOCUMENTS 4,092,455   5/1978   Pinto et al. .............................. 260/3

FOREIGN PATENT DOCUMENTS 1330905   9/1973   United Kingdom .................... 260/3

Primary Examiner—J. Ziegler

[57] ABSTRACT

Vulcanizable rubber compositions providing excellent bonding of textile or metal reinforcing fibers thereto which comprises a rubber, a filler material, and an N-(substituted oxymethyl) melamine, 4,4′-isopropylidenediphenol reaction product or solution.

2 Claims, No Drawings

TIRE CORD ADHESIVES

REFERENCE TO RELATED APPLICATION

This application is a continuation-in-part of application Ser. No. 36,112 filed May 4, 1979, now abandoned.

The invention relates to a vulcanizable rubber composition which forms a strong adhesive bond with a tire cord material.

Automobile tires and the like are usually reinforced with textile fibers in cord form, or increasingly, with steel wire and with glass cords.

British Pat. No. 1,330,905 discloses adding separately, to a vulcanizable rubber, (A) a polyhydroxy compound having the general formula,

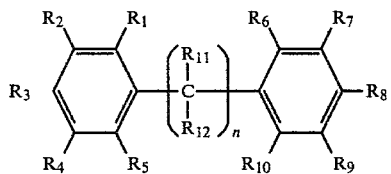

in which n has a value of from 0 to 2, and $R_1$ to $R_2$ are H atoms, OH, alkyl, allyl, aryl or aralkyl groups, at least one of $R_1$ to $R_2$ and at least one of $R_6$ to $R_{10}$ being an —OH group, at least one ortho- or para-position in each ring relative to an —OH group being occupied by a hydrogen atom, and (B) a compound capable of reacting with the polyhydroxy compound to form an aldehyde condensation resin.

Preferably, $R_1$ to $R_5$ and $R_6$ to $R_{10}$ are either —OH groups or —H atoms.

Examples of suitably polyhydroxy compounds include 2:2-bis(4-hydroxyphenyl)propane, bis(4-hydroxyphenyl)methane, 2:2-bis(3-hydroxyphenyl)propane, 4,4'-dihydroxytetraphenyl methane, 2:2-bis(2-hydroxyphenyl)propane, sym-bis(4-hydroxyphenyl)ethane, p,p'-biphenol,o.o'-biphenol, 4,4'-bi-o-cresol and bi-cresol.

The amount included in the composition may suitably be from 0.5 to 10 parts by weight per 100 parts by weight of rubber, preferably from 2.5 to 10 parts by weight per 100 parts by weight of rubber.

Rubber compositions which can be used include any of the conventional compositions based on natural and-/or synthetic rubber such as butadiene/styrene copolymers, polychloroprenes, nitrile and ethylene/propylene copolymers and terpolymer rubbers.

Compounds which are included in the vulcanizable composition and which are capable of reacting with the polyhydroxy compound are compounds which are capable of liberating methylene groups or aldehydes.

A particularly suitable compound which is capable of liberating methylene groups is hexamethylene tetramine, although other compounds, e.g. hexamethoxymethyl melamine, lauryloxymethyl pyridinium chloride, cetyloxymethyl pyridinium chloride, ethyloxymethyl pyridinium chloride, trioxan hexamethylol malamine, the hydroxyl groups of which may be esterfied or partly etherified, and polymers of formaldehyde having stabilizing groups, for example paraformaldehyde, or residues of substances such as pentaerythritol at the ends of the molecules, may be used, if desired.

U.S. Pat. No. 3,586,735 discloses the use of Bisphenol A in a resin which is added to rubber.

U.S. Pat. No. 4,092,455 discloses useful vulcanizable rubber compositions providing excellent bonding of textile or metal reinforcing fibers thereto which comprises a rubber, a filler material, an N-(substituted oxymethyl) melamine and a compound selected from 1,1'-methylenebis-(2-naphthol), 2,2'-methylenebis-(1-naphthol), mixtures thereof, 1,1'-thiobis-(2-naphthol), 2,2'-thiobis-(1-naphthol) and mixtures thereof, 4,4'-methylenebis-(1-naphthol) and 4,4'-thiobis-(1-naphthol).

The bisnaphthol compounds useful in the patent are known. It is preferable to use the methylenebis(2-naphthol) and thiobis(2-naphthol) compounds since beta naphthol is more readily available than alpha naphthol; however as indicated, either of the alpha naphthol derivatives or mixtures thereof with their beta naphthol analogs, are useful as methylene, or formaldehyde acceptors in the tire cord adhesion system described herein.

According to the patent, the N-(substituted oxymethyl) melamines which serve as the methylene donors when combined with the bisnaphthol compounds have the following general formula:

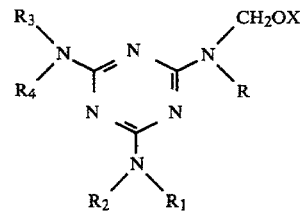

wherein X is hydrogen or lower alkyl (1–8 carbons); R, $R_1$, $R_2$, $R_3$, and $R_4$ are individually hydrogen, lower alkyl having from 1 to 8 carbon atoms or the group —CH—$_2$OX, wherein X is as defined above. Specific illustrative species include hexakis(methoxymethyl)-melamine, N,N',N''-trimethyl N,N',N''-trimethylolmelmamine, hexamethylolmelamine, N,N',N''-trimethylolmelamine, N-methylolmelamine, N,N'-dimethylolmelamine, N,N',N''-tris(methoxymethyl)melamine, and N,N',N''-tributyl-N,N',N''-trimethylolmelamine. A preferred methylene donor is hexakis(methoxymethyl)-melamine.

The N-methylol derivatives of melamine are prepared by known methods by reacting melamine with 1 to 6 molar equivalents of formaldehyde. Although N-(substituted oxymethyl) melamines are the preferred methylene donors, others such as hexamethylenetetramine, N-(substituted oxymethyl) ureas, N-(substituted oxymethyl) imidazolidines, N-(substituted oxymethyl)-hydantoins may also be useful.

The use of both resorcinol and the naphthol derivatives in tire adhesives have inherent disadvantages. Both are very expensive and with both there is the question of availability in the quantities required by the tire industry, assuming the tire industry switched to the naphthols. The invention as claimed provides a remedy to the stability cost and availability problem inherent in the prior art materials.

The advantages offered by the present invention are mainly that 4,4'-isopropylidenediphenol is both cheap and is in plentiful supply and the reaction product with methylene donor is relatively stable as compared to resorcinol formaldehyde resoles. The bis-phenol-malamine derivative solution or reaction products require less milling to achieve a uniform dispersion than bisphenol and melamine derivative added separately to a vulcanizable mixture (less milling means that less product will be lost due to scorch, or premature cure). It is also believed that better adhesion is obtained using the solution or reaction product, particularly in combination with a silica filled rubber. The melamine derivatives useful in the practice of the present invention include those disclosed in U.S. Pat. No. 4,092,455.

The bisphenols useful in the practice of the present invention are those of the formula:

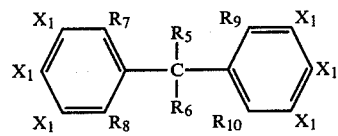

where one $X_1$ per phenyl group is hydroxyl and the remaining are hydrogen; $R_5$ and $R_6$ are hydrogen or a lower alkyl having one to three carbon atoms; and $R_7$, $R_8$, $R_9$, and $R_{10}$ are hydrogen or a lower ($C_1$–$C_8$) alkyl group. The preferred bisphenols contemplated are 4,4'-isopropylidene diphenol, 3,4'-isopropylidene diphenol and 3,3'-isopropylidene diphenol. Other bisphenols include 4,4'-methylene diphenol, 3,4'-methylene diphenol, 3,3'-methylene diphenol, 4,4'-ethylidene diphenol, 3,4'-ethylidene diphenol, 3,3'ethylidene diphenol and similar bisphenols substituted with methyl or ethyl groups in the 3- or 3'-positions.

Particularly useful reinforcing materials found to form storng adhesive bonds to rubber in accordance with the invention are glass tire cords and brass-plated steel wire.

The rubber being bonded to the reinforcing material may be any rubber used in the manufacture of automobile tires, drive belts, conveyor belts or pressure hose. These include natural rubber, synthetic diene rubbers, such as polybutadiene or polyisoprene, ethylene-propylene terpolymer rubbers (EPDM), butadiene, styrene copolymer rubbers (SBR), butadiene acrylonitrile copolymer rubbers (NBR), chloroprene rubber, or chlorosulfonated polyethylene, or mixtures thereof.

The rubber vulcanizate which is bonded to the textile fiber or steel wire by in situ resin formation will contain conventional compounding ingredients such as carbon black, antioxidants, sulfur, zinc oxide, accelerators, high surface area activated silica (including mixtures thereof with carbon black), processing and softening oils, and the like.

A reaction product or solution of the N-(substituted oxymethyl) melamine and the bisphenol compound are incorporated into the rubber vulcanizate in an amount of from about 0.5 to 12 parts per hundred of rubber, preferably 1 to 5 parts per hundred of rubber. The ratio of the melamine to the bisphenol is from 1:1 to 10:1. The melamine and bisphenol can be added to the components making up the rubber vulcanizate as a solution or a reaction product.

For optimum adhesion of the reinforcing cord material, whether glass fiber or steel, to rubber it has been found desirable to incorporate a high surface area activated silica into the vulcanizate composition. When used, the silica is added in an amount of from about 2 to 20 parts per hundred of rubber, preferably about 8 to 15 parts per hundred or rubber.

A preferred method of making the rubber vulcanizate is to mix the rubber, carbon black, zinc oxide, lubricants and the solution or reaction product of (N-substitute oxymethyl melamine) and bisphenol, in a Banbury mixer at a temperature of about 150° C. The resulting masterbatch is then compounded on a standard two-roll rubber mill with sulfur, accelerators and silica. The vulcanizable composition is shaped, placed in contact with the reinforcing material, i.e., glass fiber tire cord or steel wire, and vulcanized.

The following examples are provided for illustrative purposes and may include particular features of the invention. However, the examples should not be construed as limiting the invention, many variations of which are possible without departing from the spirit or scope thereof.

1. Materials a. 4,4'-isopropylidenediphenol (Bisphenol A): This material was practical grade Eastman Organical Chemicals, melting point 156°–158° C.

b. Hexamethoxymethylmelamine (HMMM): This material was furnished by the American Cyanamid Company as Cymel 303 (Coating Resins Department) and Cyrez 963 (Elastomers and Polymer Additives Department). It is a clear, viscous liquid with the following properties:

TABLE I

| Properties of Cymel 303 (Cyrez 963) | |
|---|---|
| Non-volatile, % | 98.0 min. |
| Ash, % | 0.01 max. |
| Free formaldehyde, % | 0.50 max. |
| Color, Gardner 1963 | 2 max. |
| Pounds/gallon, approx. | 10.0 |
| Kilograms/liter | 1.198 |
| Viscosity, Gardner-Holdt, 25° C. | X-Z2 |
| Flash point | 180° C. |

It is also available as a solid powder, 60% active on 40% inactive carrier, but more expensive in that form.

c. Conventional rubber compounding materials were used. PPG glass cord was used for most glass cord tests. The cord coated with a conventional resorcinol formaldehyde resin, vinyl pyridine-butadiene-styrene latex.

2. Preparation of "Bonding Agent BAC"

BAC is Bisphenol A (4,4'-isopropylidenediphenol) dissolved in hexamethoxymethylmelamine (Cymel 303, Cyrez 963). A mixture of 78 parts Cyrez 963 and 22 parts Bisphenol A were stored at 79° C. and agitated periodically. Complete solution was affected after about 20 hours of this procedure. The product remains a viscous liquid after one year room temperature storage.

3. Physical Testing

Standard ASTM physical test methods were used. Wire adhesion was determined by ASTM D-2229 which describes the jig used to determine pull-out force on the Instron tester. A modified slot-jig was used that gives more reproducible but lower adhesion values than the "hole" jig used by many laboratories.

Adhesion data are given in relative values. Since this study was conducted on relatively small laboratory batches and over a considerable time period, considerable variation in absolute values was encountered. Comparison between different masterbatches was avoided.

4. Rubber Compound

Table II shows the basic rubber compound used in this work. Adhesion promoters were added on the mill together with sulfur and accelerators. All parts and percentages throughout this application are by weight.

TABLE II

| Rubber Compound Used in Adhesion Tests | | |
|---|---|---|
| Material | Weight | |
| NR (Natural Rubber) | 46.50 | |
| Endor (peptizing agent zinc salt of pentachlorothiophenol) | 0.14 | |
| SBR 1500 (styrene butadiene rubber) | 38.50 | |
| Duragen 1203 (cis polybutadiene rubber) | 15.00 | |
| FEF (N-550) (carbon black) | 60.00 | (45.00) |
| HiSil 215 (silica) | 0 | (15.00) |
| BLE (antioxidant reaction product of diphenylamine and acetone) | 2.00 | |
| Philrich #5 (compounding oil) | 5.00 | |
| Zinc oxide | 3.00 | |
| Stearic Acid | 1.50 | |
| Banbury masterbatch added at RT, 5 min., stock drops at 285° F. (140° C.) | | |
| Santocure (n-cyclohexyl 2-benzothiazolyl sulfenamide) | 1.20 | |
| Crystex (sulfur) | 3.00 | |
| Rubber mill addition | | |

Results and Discussion

1. Chemistry

The following ether exchange reaction is postulated.

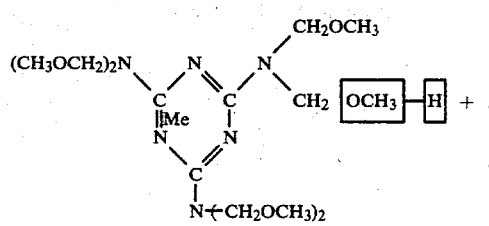

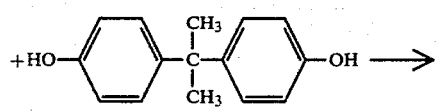

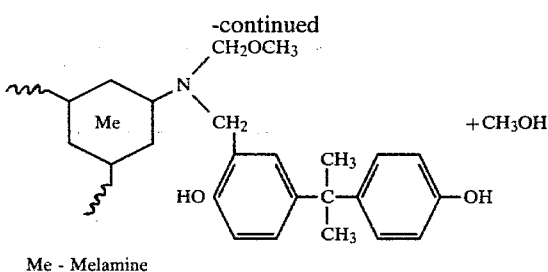

Me - Melamine

In contrast to resorcinol, Bisphenol A has four equivalent reactive positions; resorcinol has two equivalent and one position between the OH groups (position 2) that may have different reactivity, depending on the catalyst and the reaction conditions.

For the preparation of "Bonding Agent BAC," optimum conditions should be chosen, where an optimum amount of the exchange reaction will take place to avoid crystallization of the unreacted Bisphenol A. Under those conditions any residual small amount of formaldehyde present in the HMMM should also have reacted. Bisphenol A is less reactive with formaldehyde than resorcinol. Its reactivity should be comparable to phenol or p-cresol.

If the reaction is driven too far, viscosity will be excessive, making compounding mixing difficult.

2. Effect of Bisphenol A/HMMM Ratio On Adhesion to Steel and Glass Cord

Table III shows the effect of HMMM in the compound with and without silica reinforcement. In the presence of silica, modulus is slightly increased by the additive. Steel adhesion is only slightly decreased by this additive.

TABLE III

| | Effect on HMMM On Adhesion | | | |
|---|---|---|---|---|
| Additive | None | 4.1 HMMM | None | 4.1 HMMM |
| Reinforcement | 60 FEF | 60 FEF | 45 FEF 15 HiSil 233 | 45 FEF 15 HiSil 233 |
| Rubber Properties | | | | |
| Cure, min./320° F. (160° C.) | 12 | 17 | 20 | 20 |
| 100% Moldulus, psi (MPa) | 720(5.0) | 590(4.1) | 400(2.76) | 460(3.2) |
| 300% Modulus, psi (MPa) | 2700(18.7) | 2250(15.5) | 1720(12.0) | 1900(13.1) |
| Tensile, psi (MPa) | 2750(19.0) | 2750(19.0) | 2500(17.3) | 3000(20.7) |
| Shore A | 61 | 68 | 67 | 68 |
| Relative Adhesion to Steel Tire Cord (%) | | | | |
| RT | 100 | 91 | 100 | 93 |
| 250° F. (121° C.) | 100 | 92 | 100 | 96 |

Table IV shows the effect of the concentration of Bisphenol A in HMMM in the presence of SiO$_2$ (HiSil 215). At the levels studied, curing is somewhat slowed and adhesion to steel and glass cord is improved. Most of our work was done with the 22% solution to make comparisons with other bonding agents more convenient.

TABLE IV

| Variation of Bisphenol A Concentration in Bonding Agent* | | | | |
|---|---|---|---|---|
| % Bisphenol A in Bonding Agent | None | 15 | 22 | 30 |
| Rubber Properties | | | | |
| Cure 45 min./287° F. (141° C.) | | | | |
| 300% Modulus, psi (MPa) | 2150 | 1975 | 1850 | 1800 |

TABLE IV-continued

| Variation of Bisphenol A Concentration in Bonding Agent* | | | | |
|---|---|---|---|---|
| % Bisphenol A in Bonding Agent | None | 15 | 22 | 30 |
| Tensile, psi (MPa) | (14.8) 2950 (20.3) | (13.6) 3050 (21.0) | (12.8) 2950 (20.3) | (12.4) 2950 (20.3) |
| Elongation, % | 420 | 470 | 500 | 500 |
| Shore A | 65 | 69 | 67 | 68 |
| Relative Adhesion** | | | | |
| To Wire | | | | |
| RT | 100 | 128 | 122 | 132 |
| 250° F. (121° C.) | 100 | 129 | 119 | 111 |
| To Glass | | | | |
| RT | 100 | 110 | 112 | 115 |
| 250° F. (121° C.) | 100 | 115 | 110 | 103 |

*All compounds contain 15 pphr HiSil 215.
**"No additive" values are considered 100% in each column. Adhesion pads were cured at 315° F. (157° C.). Without promotor: 20 min., all others 25 min. at which time the cure had leveled out (Monsanto Rheometer). Bonding Agent contents is 4.7 pphr.

3. Effect of Bonding Agent BAC Level and HiSil 215

This study indicates an optimum in adhesion around the 4.7 pphr level of the bonding agent (Table V).

TABLE V

| Effect of Bonding Agent Level* | | | | |
|---|---|---|---|---|
| Bonding Agent BAC, pphr | 0 | 3.4 | 4.7 | 6.0 |
| Rubber Properties | | | | |
| Cure 45 min./287° F. (141° C.) | | | | |
| 300% Modulus, psi (MPa) | 1825 (12.6) | 1850 (12.7) | 1725 (11.9) | 1750 (12.1) |
| Tensile, psi (MPa) | 2825 (19.5) | 3150 (26.7) | 2925 (20.2) | 3900 (20.0) |
| Elongation, % | 450 | 520 | 520 | 520 |
| Shore A | 64 | 67 | 68 | 69 |
| Relative Adhesion Cure, min. @ 315° F. (157° C.) | 20 | 25 | 25 | 25 |
| Steel | | | | |
| RT | 100 | 104 | 125 | 100 |
| 250° F. | 100 | 121 | 127 | 110 |
| Glass | | | | |
| RT | 100 | 112 | 119 | 110 |
| 250° F. | 100 | 104 | 112 | 111 |

*Contains 45 FEF/15 HiSil 215 reinforcement

Data in Table VI indicate the importance of finely divided silica (HiSil 215) in the rubber compound for attaining maximum adhesion to steel cord. The glass cord adhesion showed less improvement by the presence of HiSil 215.

TABLE VI

| Effect of HiSil 215 on Cord Adhesion* | | |
|---|---|---|
| Reinforcement, phr | | |
| FEF | 60 | 45 |
| HiSil 215 | 0 | 15 |
| Rubber Properties | | |
| Cure 45 min./287° F. (141° C.) | | |
| 300% Modulus, psi (MPa) | 2425(16.7) | 1800(12.4) |
| Tensile, psi (MPa) | 2925(26.2) | 2975(20.5) |
| Elongation, % | 380 | 470 |
| Shore A | 69 | 67 |
| Relative Adhesion** | | |
| Steel | | |
| RT | 100 | 158 |
| 250° F. (121° C.) | 100 | 138 |
| Glass | | |
| RT | 100 | 106 |
| 250° F. (121° C.) | 100 | 112 |

*Compounds contain 4.7 pphr Bonding Agent BAC
**Adhesion samples were cured 25 min./315° F. (157° C.)

Data in Table VII indicate performance on steel and glass in the presence of HiSil 215.

TABLE VII

| Bonding Agent | None | 4.7 phr BAC* |
|---|---|---|
| Rubber Properties | | |
| Cure 45 min./287° F. (141° C.) | | |
| 300% Modulus, psi (MPa) | 1825(12.6) | 1725(11.9) |
| Tensile, psi (MPa) | 2825(19.5) | 2925(20.2) |
| Elongation, % | 450 | 520 |
| Shore A | 64 | 68 |
| Relative Adhesion Cure @ 315° F. (157° C.) | 20 | 25 |
| Steel | | |
| RT | 100 | 126 |
| 250° F. (121° C.) | 100 | 127 |
| Glass | | |
| RT | 100 | 119 |
| 250° F. (121° C.) | 100 | 111 |

*All compounds contain 45 FEF/15 HiSil 215.

I claim:
1. In a vulcanizable rubber composition comprising rubber and a silica filler, the improvement which is characterized by incorporating into the rubber composition an effective adhesion promoting amount of a liquid reaction product of an N-(substituted oxymethyl) melamine having the general formula:

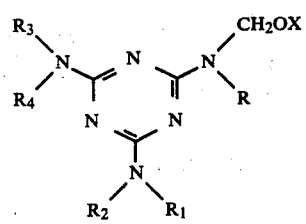

and a bisphenol of the formula:

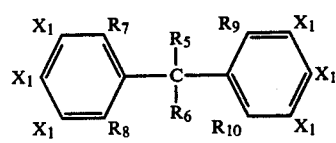

wherein X is hydrogen or lower ($C_1$–$C_8$) alkyl; R, $R_1$, $R_2$, $R_3$ and $R_4$ are individually hydrogen, lower ($C_1$–$C_8$) alkyl or the group —$CH_2OX$, X being as defined hereinabove, one $X_1$ per phenyl group is hydroxyl and the remaining are hydrogen, $R_5$ and $R_6$ are hydrogen or a lower alkyl having one to three carbon atoms, and $R_7$, $R_8$, $R_9$ and $R_{10}$ are hydrogen or a lower ($C_1$–$C_8$) alkyl group.

2. In a vulcanizable rubber composition according to claim 1, where the melamine compound is hexamethoxymethyl melamine and the bisphenol compound is 4,4'-isopropylidene diphenol.

* * * * *